(12) United States Patent
Edelmann

(10) Patent No.: US 6,346,057 B1
(45) Date of Patent: Feb. 12, 2002

(54) BELT TENSIONING DEVICE

(76) Inventor: Klaus Edelmann, Roxheimer Str. 8, D-67547 Worms/Rhein (DE)

( * ) Notice: Subject to any disclaimer, the term of this patent is extended or adjusted under 35 U.S.C. 154(b) by 0 days.

(21) Appl. No.: 09/449,374

(22) Filed: Nov. 24, 1999

(30) Foreign Application Priority Data

Nov. 25, 1998 (DE) ............................................. 19854327
Nov. 9, 1999 (DE) ........................................ 199 53 691

(51) Int. Cl.$^7$ ............................. F16H 7/12; F16H 47/08
(52) U.S. Cl. ....................................... 474/135; 474/110
(58) Field of Search ................................ 474/135, 133, 474/101, 138, 130, 112–117

(56) References Cited

U.S. PATENT DOCUMENTS

| 993,684 | A | * | 5/1911 | Vom Hoff | 474/131 |
| 3,581,481 | A | * | 6/1971 | Hanson et al. | 474/135 X |
| 4,036,069 | A | * | 7/1977 | Clark | 474/135 |
| 5,002,519 | A | * | 3/1991 | Oshima et al. | 474/134 |
| 5,730,453 | A | * | 3/1998 | Owsen | 474/135 X |
| 5,888,159 | A | * | 3/1999 | Liao | 474/116 |
| 5,935,032 | A | * | 8/1999 | Bral | 474/135 X |
| 6,068,567 | A | * | 5/2000 | Thompson | 474/140 X |
| 6,129,644 | A | * | 10/2000 | Inoue | 474/110 |

FOREIGN PATENT DOCUMENTS

| AT | 355 983 | 10/1980 |
| DE | 42 44 170 C2 | 6/1994 |
| DE | 198 54 327 C2 | 6/2000 |

OTHER PUBLICATIONS

English Abstract of DE 42 44 170 C2.
English Abstract of DE 198 54 327 C2.
English Abstract of AT 355 983.

* cited by examiner

Primary Examiner—Charles A Marmor
Assistant Examiner—Roger Pang
(74) Attorney, Agent, or Firm—Reed Smith LLP

(57) ABSTRACT

For securing the position of the conveyor belt when starting the belt under load, a belt tensioning device, has a circulating conveyor belt, carrying idlers arranged between the carrying run and the return run of the conveyor belt, a drive mechanism, a power transmission device for moving the conveyor belt, a gear ring and a toothed belt for power transmission, the gear ring being allocated to the power transmission device and the toothed belt being allocated to the conveyor belt, wherein a guiding component part adapted to the edge area of the circulating conveyor belt and a contacting component part for direct contact with the surface of the conveyor belt are provided, and wherein the contacting component part is arranged inside the guiding component part.

23 Claims, 4 Drawing Sheets

BELT TENSIONING DEVICE

BACKGROUND OF THE INVENTION a) Field of the Invention

The present invention is directed to a belt tensioning device for a belt conveyor, to be arranged in the area of the drive at the lateral edge of the conveyor belt.

b) Description of the Related Art

A wide variety of drive and power transmission arrangements for belt conveyors are known from prior art. DE 42 44 170 C2, for example, shows a driven frictional wheel that acts on the conveyor belt through frictional engagement. AT 355 983 shows a gearwheel drive with gears that engage in toothed strips on the underside of the conveyor belt; the power transmission is accordingly realized by way of a positive engagement.

Irrespective of the type of power transmission between drive and conveyor belt, there arises precisely in the area of the drive at the lateral edge of the conveyor belt the problem of a disturbance of power transmission caused by the conveyor belt "slipping away" when the conveyor belt is loaded with goods to be conveyed. This kind of change in position of the conveyor belt negatively affects the power transmission and the running of the conveyor belt in general.

OBJECT AND SUMMARY OF THE INVENTION

Therefore, it is the primary object of the invention to provide a belt tensioning device that ensures a constant position of the conveyor belt—even when the latter is loaded—in the area of the drive or of power transmission along the lateral edge of the belt.

In accordance with the invention, the belt tensioning device for a belt conveyor that is to be located in the area of the drive at the lateral edge of the conveyor belt has a guiding component part matching the edge area of the circulating conveyor belt and a contacting component part for direct contact with the surface of the conveyor belt; this contacting component part being located inside the guiding component part.

It has been recognized that securing the conveyor belt in position at the point of power transmission can be achieved when an additional structural component part is provided that acts upon the surface of the belt. Further, it has been recognized that for a low-loss holding down of the conveyor belt the component part advantageously has a structural form made up of two principal component parts. Finally, it has been recognized that a separation of the functions can be achieved by providing a guiding component part and a contacting component part. The guiding component part is used as a connection to the frame of the belt conveyor and to hold and guide the contacting component part. The contacting component part on the other hand realizes the positional securing of the conveyor belt through direct contact.

In order that the belt tensioning device according to the invention can be used on a belt conveyor, the guiding component part could be arranged at the end of a carrying drive pulley of the belt conveyor and fixed its side cheek. Also, instead of fixing it to the side cheek, a side component part of greater thickness could be used especially in the area of the drive. With regard to the construction of the belt tensioning device that includes the journal of the carrying drive pulley that is connected with the gear unit and motor, the side component part could extend on both sides of the journal. The side component part could preferably be bent at an angle and frame the belt tensioning device in such a way that it does not impede the running of the conveyor belt.

The embodiment example, described hereinafter, of the belt tensioning device according to the invention is directed to a type of power transmission that takes place between the carrying run and the return run of the conveyor belt. In particular, this is a gearwheel drive with one gear ring on the end of the carrying drive pulley and a toothed belt provided at the edge area of the conveyor belt in accordance with the German Patent Application 198 54 327.1 which does not form part of prior art. However, it should be noted at this point that the following embodiment example can be applied to any type of power transmission taking place between the carrying run and the return run of the conveyor belt.

Considering the preceding statements, the guiding component part could be designed essentially as a rectangular hollow body having an opening to receive or grip around the carrying drive pulley of the belt conveyor. The opening could advantageously extend in the area of a first main side and the rear side of the rectangular hollow body. The portion of the opening on the main side could be adapted to the cross-sectional dimensioning of the carrying drive pulley and can have be arc-shaped. Correspondingly, the rear-side portion of the opening could also be adapted to the maximum cross-sectional dimensioning of the carrying drive pulley, including the thickness of the conveyor belt. This results in a guiding component part that grips around the carrying drive pulley. The area of power transmission of the carrying drive pulley and the conveyor belt is more or less located in the arc-shaped recess.

As an alternative to a possible symmetric belt tensioning device that can be slipped onto the carrying drive pulley from the front, it is especially advantageous when the second main side of the guiding component part located opposite to the first main side with the above-described opening is formed so as to be almost completely closed and only has a through-opening for the journal of the carrying drive pulley. A substantially closed main side results on the one hand in a compact structural shape that is appropriate to the idea of guiding with regard to the contacting component part; on the other hand, the extensively closed main side gives more options for fixing the belt tensioning device according to the invention to the side cheek or a special side component part of the belt conveyor.

For fixing the device to the side cheek or to the side component part, various bore holes into which fastening means are inserted could be provided in the mostly closed main face. The rectangular block-shaped hollow body of the guiding component part could have a top side, a front side and a bottom side, in addition to the two main sides and the rear side. Further, with respect to the arc-like arrangement of the contacting component part, a sloping portion could be provided between the front side and the bottom side and between the front side and the top side, respectively. Also with respect to the supporting and shaping of the contacting component part, the front side could have a slit-shaped recess into which the contacting component part partially projects. When installed on the belt conveyor, the slit-shaped recess could be covered by the angled area of the side component part so as to achieve protection from and for the moveable contacting component part.

A further measure with respect to the bearing of the guiding component part is formed by a groove running inside the guiding component part. The extent of the groove inside the guiding component part could—like the opening in the first main side—be adapted to the cross-sectional dimensioning of the carrying drive pulley and follow an arc-like course. The groove could be essentially U-shaped in cross section. According to the present embodiment example, the groove could extend to the rear side of the guiding component part so that the free ends of the groove are open to the outside. But it would also be possible to provide a groove only in the area in which the contacting component part extends.

In a further embodiment form of the present embodiment example of the belt tensioning device according to the invention, the groove passes into the above-described slit-shaped construction of the front side and basically extends on both sides of the slit-shaped recess. In this manner, the groove in the area of the slit-shaped recess is defined only by the lateral edge areas, whereas there is no corresponding base.

With respect to an easy installation and manufacture of the belt tensioning device, the guiding component part could be made up of two parts, with the first and second part connected to each other in a detachable fashion in the manner of a lid and receptacle. One side boundary of the groove could advantageously be formed by the first part of the guiding component part and the base and other side boundary of the groove could be formed by the second part of the guiding component part. This has the advantage that the assembly of the guiding component part together with the contacting component part can be realized very simply and manufacture of the individual parts is simplified.

The contacting component part could have at least one means of contact in the shape of a ball bearing, a roller or a wheel to act upon the conveyor belt. Mobility of the bearing of the contacting means is essential so that there is no wear from excessive friction at the conveyor belt.

The bearing of the contacting component part could be realized by an axle arranged transverse to the course of the groove. To achieve a multiple and therefore more effective action upon the largest possible areas of the conveyor belt, it is advantageous to provide a plurality of axles, each with contacting means, which are arranged successively at a distance from each other. Depending on the load put on the conveyor belt and the type and design of power transmission means, it would also be possible to design the axles to receive a plurality of contacting means.

According to an especially preferable arrangement of the present embodiment example of the belt tensioning device according to the invention, a springing pressure piece could be provided; this would make it possible for the contacting means to be supported not only rotatably but also in a springing manner. This further reduces frictional wear of the surface of the conveyor belt, so that the contact between the contacting component part and conveyor belt is largely without consequences for the surface of the conveyor belt. Two springing pressure pieces forming the springing bearing for the axle on both sides of the centrally located contacting means are especially preferable.

In case a plurality of contacting means are to be used, these could be placed in the groove of the guiding component part and could protrude beyond the side limit of the groove; here again there is an adapting to the cross-sectional dimensioning of the carrying drive pulley, including the thickness of the belt. The embodiment form under discussion in which a plurality of contacting means is provided could have a total of eight contacting means, for example, in the form of ball bearings, each located on one axle. As regards the springing pressure pieces, only six pairs are required in the embodiment form under discussion. The six pairs of springing pressure pieces could be distributed in the area of the top side and bottom side as well as in the area of the sloping portions of the guiding component part, while two of the contacting means project into the slit-shaped recess of the front side. A springing bearing for the contacting means projecting into the slit-shaped recess of the front side is not strictly necessary insofar as the forces caused by the load of the goods to be conveyed are not as considerable at this location and the requirement for flexible means for securing in position is accordingly also not as demanding.

To permit easy readjustment of the springing pressure pieces, they could be accessible from the outside and, for example, readjusted via hexagon bolts.

The belt tensioning device according to the invention proceeds from a further development of the as yet unpublished German Patent Application 198 54 327.1 which is directed to a belt conveyor with a gearwheel drive between the carrying run and the return run, but it can also be applied to other types of power transmission, especially those between the carrying run and the return run. For the belt conveyor according to the German Patent Application 198 54 327.1, the problem to avoid was the disengaging of the teeth of the gearwheel of the carrying drive pulley and toothed belts on the bottom side of the belt when starting a loaded belt. The preceding embodiment form refers to this in particular; the belt tensioning device reaches over the outside surface of the conveyor belt in the area where the toothed belt is located and meshes with the gearwheel of the carrying drive pulley.

The teaching of the present invention can be advantageously configured and further developed in a variety of ways. In connection with the description of the above-mentioned embodiment example of the invention described below, preferred arrangements and further developments of the teaching are also described in general.

While the foregoing description and drawings represent the present invention, it will be obvious to those skilled in the art that various changes may be made therein without departing from the true spirit and scope of the present invention.

DESCRIPTION OF THE PREFERRED EMBODIMENTS

Figure 1:
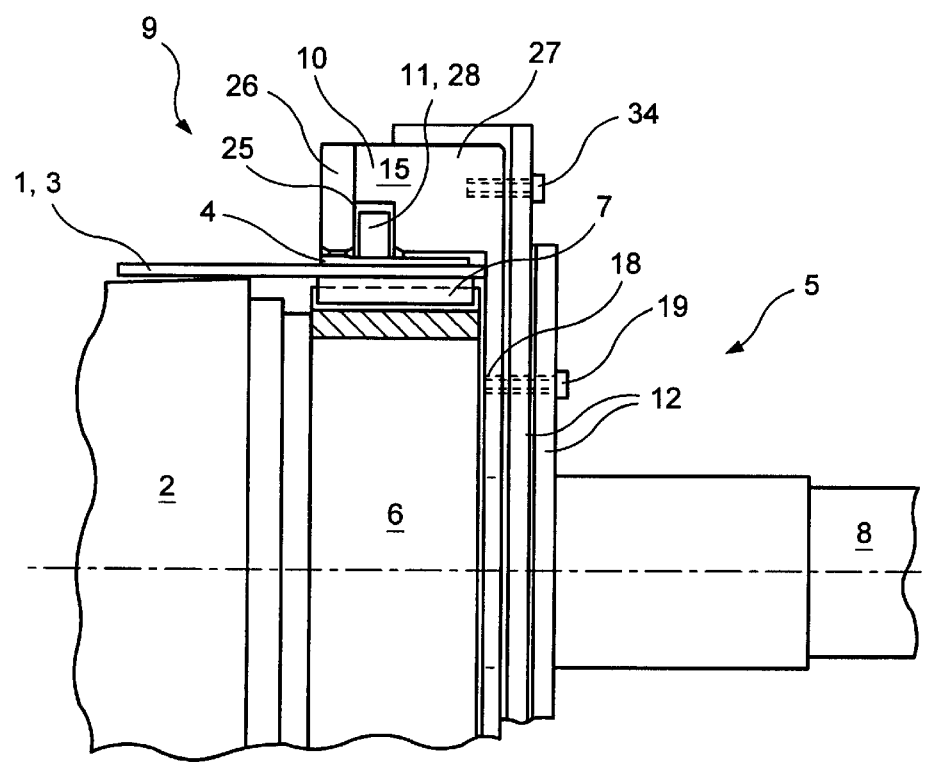
FIG. 1 is a schematic view of an embodiment example of the belt tensioning device according to the invention fitted to the carrying drive pulley of the belt conveyor according to the German Patent Application 198 64 327.1, as seen from the back.
Figure 2:
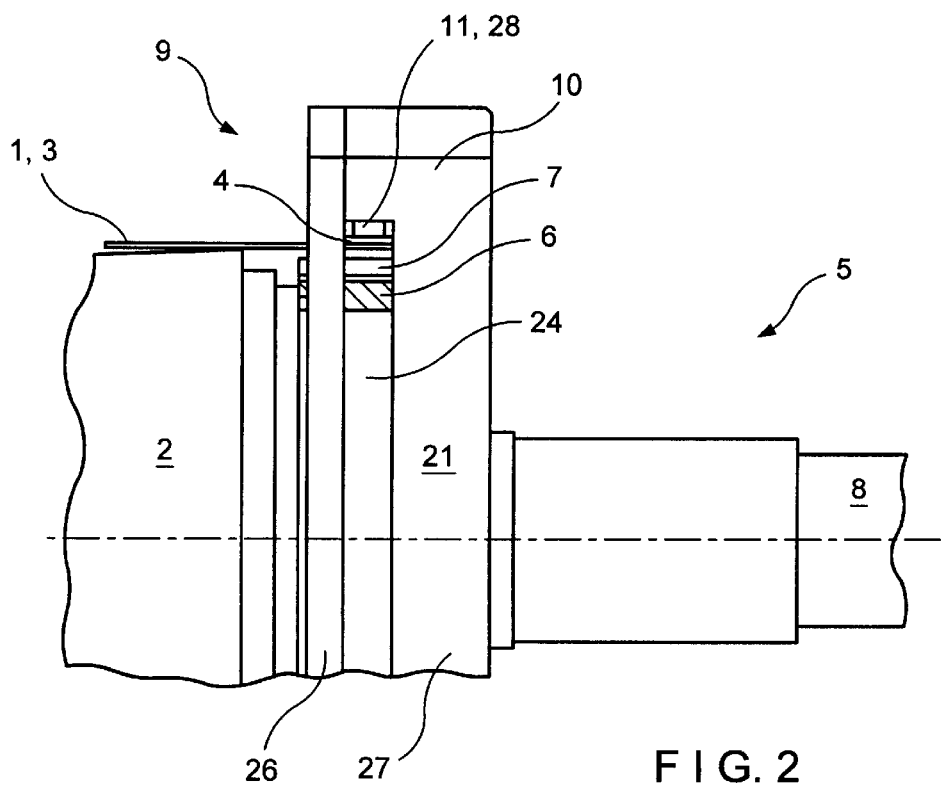
FIG. 2 is a schematic view showing essentially the subject of FIG. 1 as seen from the front.

FIGS. 1 and 2 show the belt tensioning device, according to the invention, for a belt conveyor. The belt tensioning device is arranged in the drive area at the lateral edge of the conveyor belt 1. More particularly, this is a guiding component part 10 which is adapted to the edge area 9 of the circulating conveyor belt 1 and inside of which is arranged a contacting component part 11 for direct contact with the surface of the conveyor belt 1.

The contacting component part 11 is in contact with a profile 4 on the top side of the conveyor belt 1, shown here at the carrying run 3. The profile 4 has a raised portion which faces away from the edge area 9 and which is intended for contact with guide idlers, not shown, outside of the drive area. The power transmission device 5 comprises the gear ring 6 which is arranged at the carrying drive pulley 2 and which meshes with the toothed belt 7 on the bottom side of the conveyor belt 1. The journal 8 of the carrying drive pulley 2 is connected with a unit, not shown, comprising a drive motor and gear unit.

The guiding component part 10 is arranged at the end of the carrying drive pulley 2 of the belt conveyor and is fixedly mounted on a two-part side component part 12 of the belt conveyer, shown in FIG. 1, which is bent at an angle.

Figure 3:
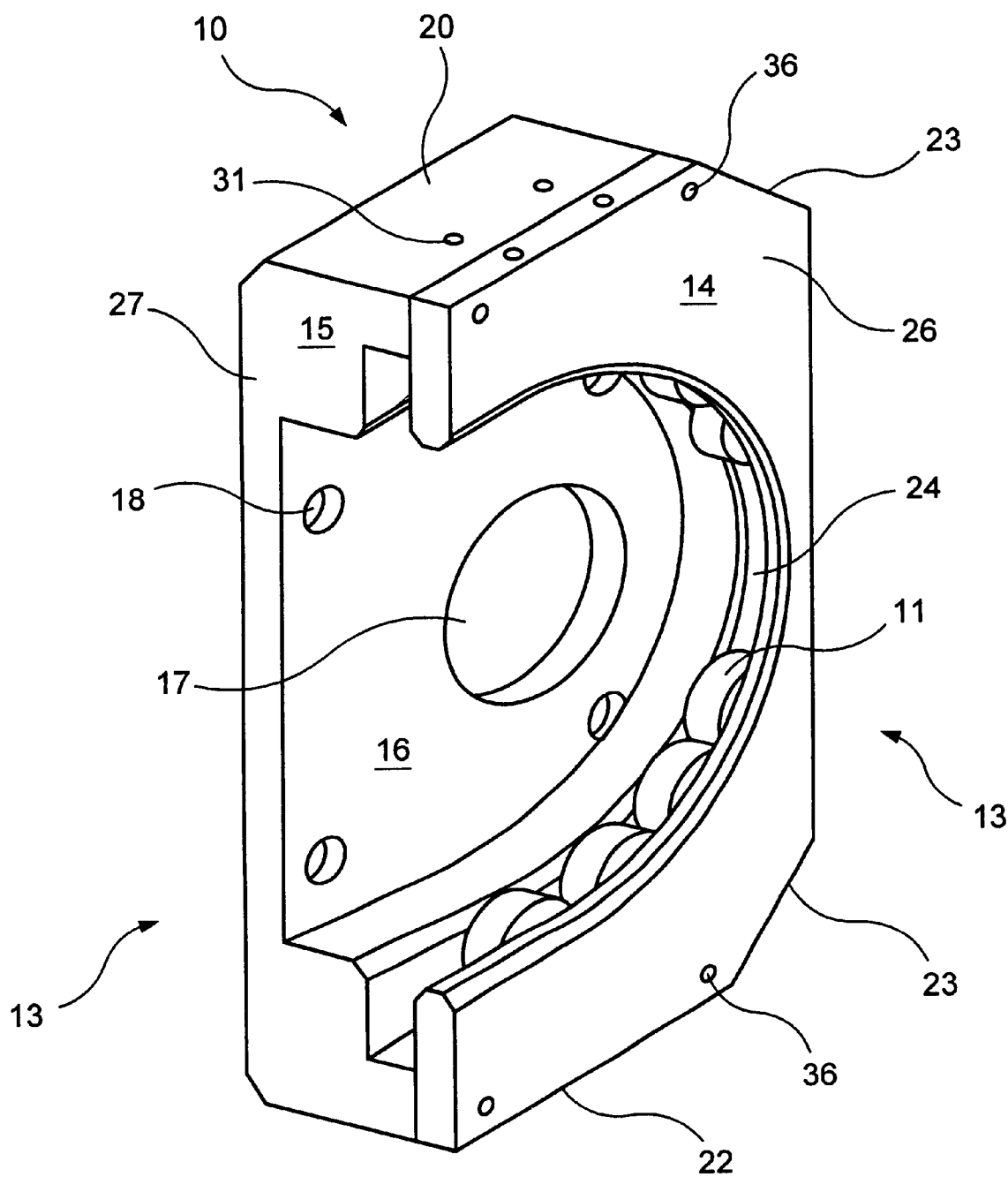
FIG. 3 shows a schematic and perspective view of the embodiment example of the belt tensioning device according to the invention as a separate component part.
Figure 5:
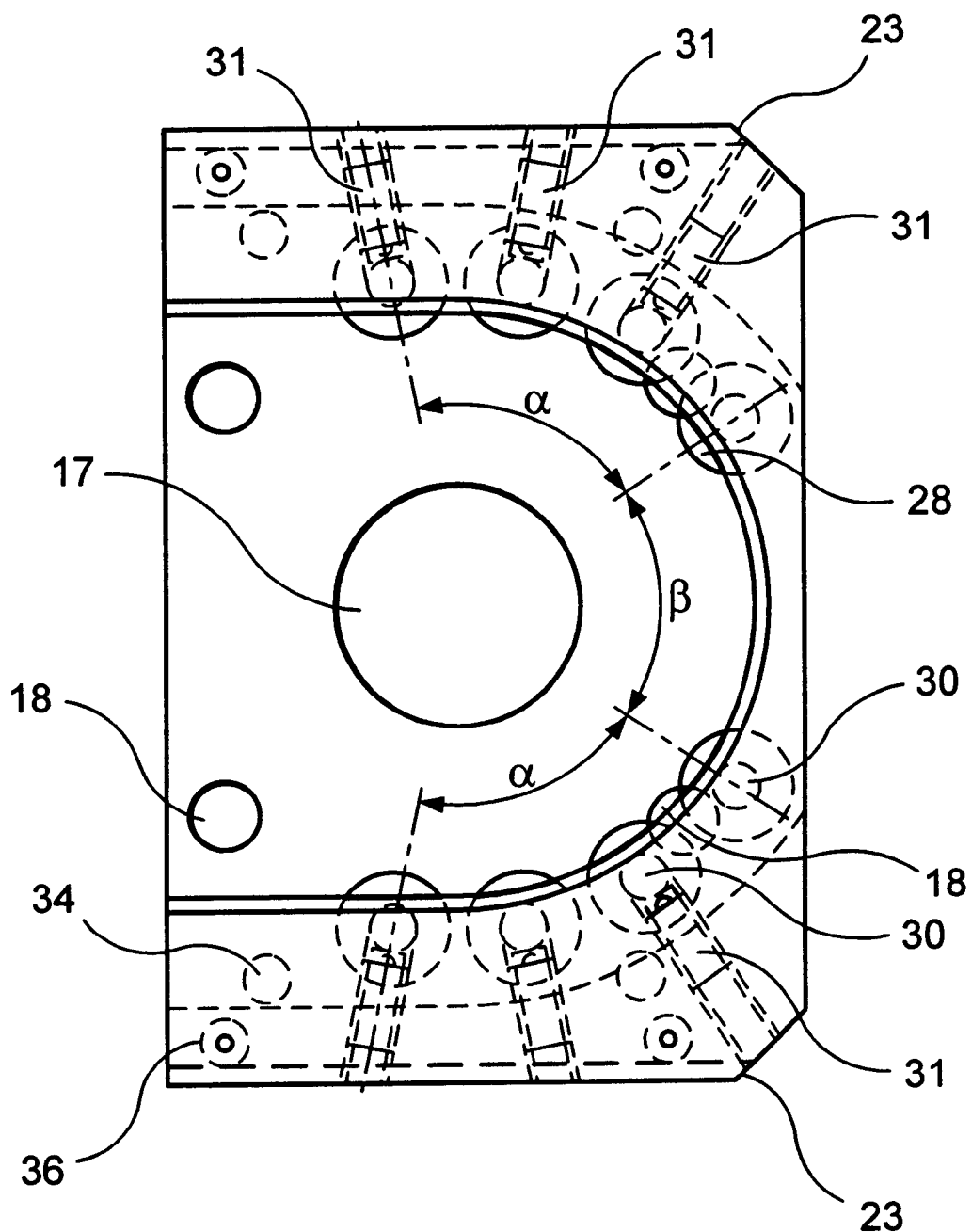
FIG. 5 is a side view of the embodiment example of the belt tensioning device according to the invention showing the first main side of the first part of the belt tensioning device.

FIG. 3 shows that the guiding component part 10 is similar to a rectangular hollow body that is provided with an opening 13 for receiving or gripping around the carrying drive pulley 2. The opening 13 extends over the area of the first main side 14 and the area of the rear side 15 of the guiding component part 10. The main side portion of the opening 13 is adapted to the cross-sectional dimensions of the carrying drive pulley 2 and is shaped in an arc-like manner. The angles designated in FIG. 5 by $\alpha$ and $\beta$ describe the arc which merges into straight-line portions and have values of $\alpha=65°$ and $\beta=70°$. There are two different radian measures for $\alpha$ and $\beta$. The rear-side portion of the opening 13 is adapted to the maximum cross-sectional dimensions of the carrying drive pulley 2.

Opposite to the first main side 14 of the guiding component part 10, there is a second main side 16 having a through-opening 17 for the journal 8 of the carrying drive pulley 2.

FIGS. 1 and 3 to 5 also show that the second main side 16 has bore holes 18. The means of fastening means 19 indicated in FIG. 1 are inserted through both plates of the two-part side component 12 of the belt conveyor as well as through the bore hole 18 and are fixed to the guiding component part 10.

In addition to the two main sides 14, 16 and the rear side 15, the guiding component part 10 also comprises a top side 20, a front side 21 and a bottom side 22. Further, a sloping portion 23 is provided between the front side 21 and top side 20 and between the front side 21 and bottom side 22.

Figure 4:
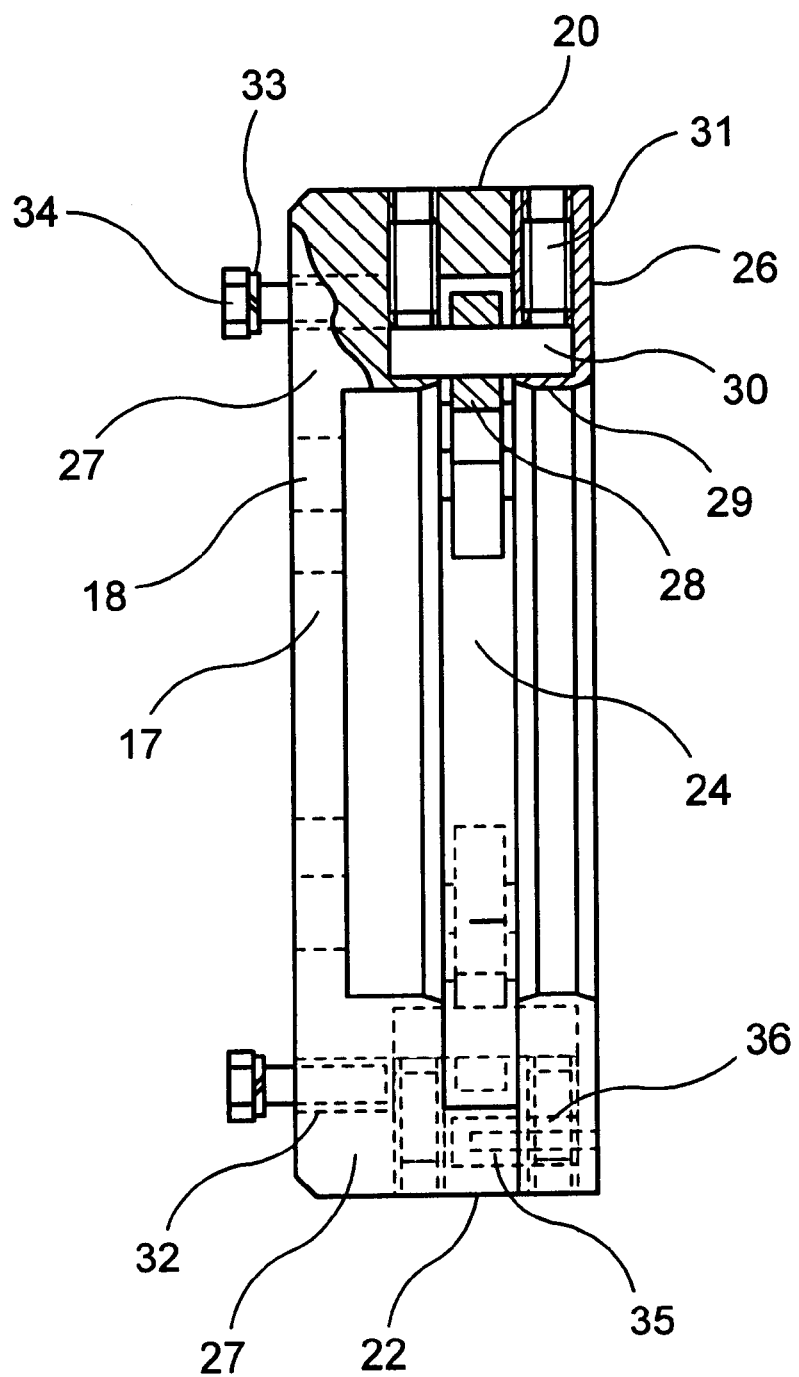
FIG. 4 shows a rear view of the embodiment example of the belt tensioning device according to the invention in partial cross section.

FIGS. 2 to 4 also show that the front side 21 has a slit-shaped recess 24 into which the contacting component part 11 projects. Further, a groove 25 has been provided for the contacting component part, which groove 25 extends on the inside of the guiding component part 10 along an arc-shaped course adapting to the cross-sectional dimensions of the carrying drive pulley 2, and has a substantially U-shaped cross-section. The groove 25 has a free end at both the upper and lower area of the rear side 15 of the guiding component part 10 and passes into the slit-shaped recess 24 in the area of the front side 21.

FIGS. 1 to 4 show that the guiding component part 10 is formed of two parts and comprises a first part 26 and a second part 27 which are detachably connected to each other. The groove 25 described above is formed by the two parts 26, 27 of the guiding component part 10. Here, the first part 26 of the guiding component part 10 comprises one side boundary of the groove 25, and the second part 27 of the guiding component part 10 comprises the other side boundary and the base of the groove 25.

In the embodiment example shown herein, the contacting component part 11 contains a total of eight contacting means 28 in the shape of ball bearings, in particular, grooved ball bearings. Each of the contacting means 28 is flanked on both sides by supporting washers or disks 29 and is arranged centrally on an axle 30 that extends transverse to the groove 25 or recess 24 so as to be rotatable.

A pair of springing pressure pieces 31 extends in each instance at right angles to axle 30 in the area of the sloping portions 23, the top side 20 and the bottom side 22 at either side of the contacting means 28. As can be seen especially in FIG. 5, the contacting means 28 project beyond the groove 25. In the area of the front side 21, the groove 25 merges with the slit-shaped recess 24 and two of the contacting means 28 project into the recess 24. Axles 30, but not pressure pieces 31, have been provided for the front-side contacting means 28.

For purposes of screwing the belt tensioning device to the belt-side plate of the two-part side component part 12, shown in FIG. 1, a threaded insert 32 has been provided on the second main side 16 of the guiding component part 10; a screw 34 with a Schnorr-type washer has been screwed into this.

For connecting the first and second part 26, 27 of the guiding component part 10, a total of four threaded inserts 35 and four countersunk hexagon socket screws 36 have been provided.

The embodiment form shown herein comprises two variants. The variant shown in FIGS. 1 to 3 differs from the variant according to FIGS. 4 and 5 through the adapting of the construction geometry to the structure of the profile 4 on the top side of the guide belt 1. The variant according to FIGS. 1 to 3 shows that the first part 26 is dimensioned so as to be somewhat shorter than the second part 27 with respect to the side boundary of the groove 25, so that space is provided for the raised portion of the profile 4 facing away from the edge area 9.

However, there is no such adaptation of the construction geometry of the guiding component part 10 to an uneven profile at the top side of the guiding belt 1, and the dimensioning of the first part 26 compared with the second part 27 with respect to the side boundary of the groove 25 is identical.

To avoid sharp edges within areas that can be reached by hand, the edge areas around the groove 25 of the opening 13 on the main side and between the second main side 16 and the top side and bottom side 20, 22 have been beveled.

With respect to further features not shown in the drawings, reference is had to the general portion of the description.

Finally, it should be pointed out that the teaching according to the invention is not limited to the discussed embodiment example. On the contrary, different structural shapes of the belt tensioning device, contacting component parts and guiding component parts are possible and can be used for belt curves, S-curves or straight belt conveyors.

What is claimed is:

1. A belt tensioning device for a belt conveyor, to be arranged in the area of a drive at a lateral edge of a conveyor belt comprising:

a guiding component part adapted to an edge area of a circulating conveyor belt; and a contacting component part for direct contact with a surface of the conveyor belt;

said contacting component part being arranged inside said guiding component part wherein said guiding component part can be arranged at the drive-side end of a carrying drive pulley of the belt conveyor and can be fixed to a side cheek or a side component part of the belt conveyor;

in the case of a power transmission taking place between the carrying run and the return run, wherein the guiding component part resembles a rectangular hollow body with an opening for partially receiving or gripping around the carrying drive pulley of the belt conveyor.

2. The belt tensioning device according to claim 1, wherein the opening extends at least in the area of a first main side and a rear side of the guiding component part.

3. The belt tensioning device according to claim 2, wherein the main-side portion of the opening is arc-shaped to adapt to the cross-sectional dimensioning of the carrying drive pulley.

4. The belt tensioning device according to claim 2, wherein the rear-side portion of the opening is adapted to the maximum cross-sectional dimensioning of the carrying drive pulley.

5. The belt tensioning device according to claim 2, wherein a second main side located opposite to the first main side has a through-opening for the journal of the carrying drive pulley.

6. The belt tensioning device according to claim 2, wherein a second main side has bore holes for fastening means for fixing the guiding component part to the side component part of the belt conveyor.

7. The belt tensioning device according to claim 2, wherein, in addition to the first main side and a second main side and the opening rear side, the guiding component part has a top side, a front side and a bottom side.

8. The belt tensioning device according to claim 7, wherein a sloping portion is provided between the front side and the top side as well as between the front side and the bottom side.

9. The belt tensioning device according to claim 7, wherein the front side has a slit-shaped recess for receiving the contacting component part.

10. A belt tensioning device for a belt conveyor, to be arranged in the area of a drive at a lateral edge of a conveyor belt comprising:

a guiding component part adapted to an edge area of a circulating conveyor belt; and a contacting component part for direct contact with a surface of the conveyor belt;

said contacting component part being arranged inside said guiding component part;

wherein inside the guiding component part a groove has been provided for the contacting component part; and wherein the groove extends in an arc-shaped manner inside of the guiding component part to adapt to the cross-sectional dimensioning of the carrying drive pulley and is essentially U-shaped in cross section.

11. The belt tensioning device according to claim 10, wherein the free ends of the groove are on the rear side of the guiding component part.

12. A belt tensioning device for a belt conveyor, to be arranged in the area of a drive at a lateral edge of a conveyor belt comprising:

a guiding component part adapted to an edge area of a circulating conveyor belt; and a contacting component part for direct contact with a surface of the conveyor belt;

said contacting component part being arranged inside said guiding component part;

wherein the guiding component part is formed of two parts;

wherein one side boundary of the groove is formed by the first part of the guiding component part, and wherein the other side boundary and the base of the groove are formed by the second part of the guiding component part.

13. The belt tensioning device according to claim 12, wherein the first part and the second part of the guiding component part are connected to each other in detachable fashion.

14. A belt tensioning device for a belt conveyor, to be arranged in the area of a drive at a lateral edge of a conveyor belt comprising:

a guiding component part adapted to an edge area of a circulating conveyor belt; and a contacting component part for direct contact with a surface of the conveyor belt;

said contacting component part being arranged inside said guiding component part; wherein the contacting component part has at least one contacting means, comprising one of a ball bearing, a roller or wheel, for acting on the conveyor belt;

wherein the contacting means project beyond the side boundary of the groove and are adapted to the cross-sectional dimensioning of the carrying drive pulley.

15. The belt tensioning device according to claim 14, wherein at least one axle is arranged transverse to the course of a groove of the guiding component part for rotatable support of at least one contacting means.

16. The belt tensioning device according to claim 15, wherein a plurality of axles, each with contacting means, are provided at a distance from one another.

17. The belt tensioning device according to claim 15, wherein at least one springing pressure piece is provided at right angles to the axle.

18. The belt tensioning device according to claim 17, wherein a springing pressure piece is provided at both sides of the contacting means which are centrally arranged on an axle.

19. The belt tensioning device according to claim 14, wherein the groove extends in an arc-shaped manner, wherein a total of eight contacting means are provided on eight axles together with six pairs of springing pressure pieces.

20. The belt tensioning device according to claim 19, wherein two contacting means project into the slit-shaped recess in the front side.

21. The belt tensioning device according to claim 19, wherein four pairs of the springing pressure pieces extend over the top side and the bottom side of the guiding component part to the axle, wherein two pairs of springing pressure pieces extend over the sloping portions of the guiding component part to the axle, and wherein pressure pieces are accessible from the outside.

22. A belt tensioning device for a belt conveyor, to be arranged in the area of a drive at a lateral edge of a conveyor belt comprising:

a guiding component part adapted to an edge area of a circulating conveyor belt;

a contacting component part for direct contact with a surface of the conveyor belt;

said contacting component part being arranged inside said guiding component part;

the belt conveyor with a circulating conveyor belt, with carrying idlers that are arranged between the carrying run and the return run of the conveyor belt, with a drive mechanism, with a power transmission device for moving the conveyor belt, with a gear ring and a toothed belt for power transmission, wherein the gear ring is associated with the power transmission device and the toothed belt is associated with the conveyor belt, wherein a belt tensioning device is provided in the area of the first carrying drive pulley actively connected to the drive mechanism for securing the position of the conveyor belt when starting the belt under load.

23. The belt tensioning device according to claim 22, said device stabilizing the position of the conveyor belt in the area of a first carrying drive pulley actively connected to a drive mechanism in the belt conveyor.

* * * * *